United States Patent
Fasching et al.

(10) Patent No.: US 10,734,828 B2
(45) Date of Patent: Aug. 4, 2020

(54) BATTERY CHARGERS AND ASSOCIATED SYSTEMS AND METHODS

(71) Applicant: Maxim Integrated Products, Inc., San Jose, CA (US)

(72) Inventors: Rainer Fasching, Mill Valley, CA (US); Georgy Zerkalov, San Jose, CA (US); Jason Wortham, San Jose, CA (US)

(73) Assignee: Maxim Integrated Products, Inc., San Jose, CA (US)

(*) Notice: Subject to any disclaimer, the term of this patent is extended or adjusted under 35 U.S.C. 154(b) by 78 days.

(21) Appl. No.: 16/185,347

(22) Filed: Nov. 9, 2018

(65) Prior Publication Data

US 2019/0148964 A1    May 16, 2019

Related U.S. Application Data

(60) Provisional application No. 62/584,503, filed on Nov. 10, 2017.

(51) Int. Cl.
*H02J 7/00* (2006.01)
*H01M 10/44* (2006.01)
*H01M 10/48* (2006.01)
*H01M 10/46* (2006.01)
*H01M 10/42* (2006.01)

(52) U.S. Cl.
CPC ......... *H02J 7/00711* (2020.01); *H01M 10/44* (2013.01); *H01M 10/441* (2013.01); *H01M 10/46* (2013.01); *H01M 10/48* (2013.01); *H02J 7/0086* (2013.01); *H01M 2010/4271* (2013.01)

(58) Field of Classification Search
CPC .................................................. H02J 7/00711
USPC .................................................. 320/137, 139
See application file for complete search history.

(56) References Cited

U.S. PATENT DOCUMENTS

| | | | |
|---|---|---|---|
| 5,694,023 A | 12/1997 | Podrazhansky et al. | |
| 6,366,056 B1 | 4/2002 | Podrazhansky et al. | |
| 8,198,863 B1 | 6/2012 | Wortham | |
| 8,368,357 B2 * | 2/2013 | Ghantous | G01R 31/382 320/134 |
| 8,502,504 B1 | 8/2013 | Wortham | |
| 10,193,366 B2 * | 1/2019 | Josephs | H02J 7/00711 |

* cited by examiner

*Primary Examiner* — Edward Tso
*Assistant Examiner* — Ahmed H Omar
(74) *Attorney, Agent, or Firm* — Lathrop GPM LLP

(57) ABSTRACT

A method for charging a battery includes (a) applying a charging current pulse to the battery, (b) after the step of applying the charging current pulse to the battery, measuring a first voltage across the battery, (c) estimating an equilibrium voltage of the battery, (d) determining a Nernst voltage of the battery from a difference between the first voltage and the equilibrium voltage, and (e) controlling charging of the battery at least partially based on the Nernst voltage.

20 Claims, 16 Drawing Sheets

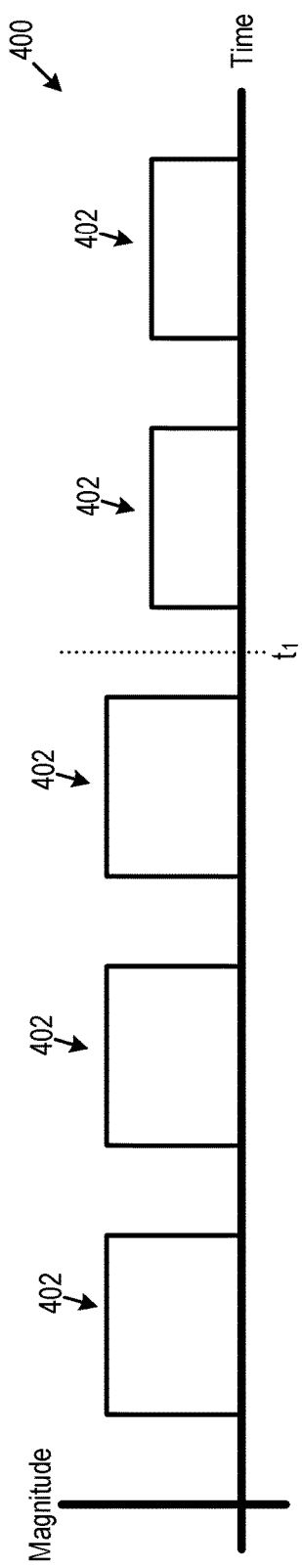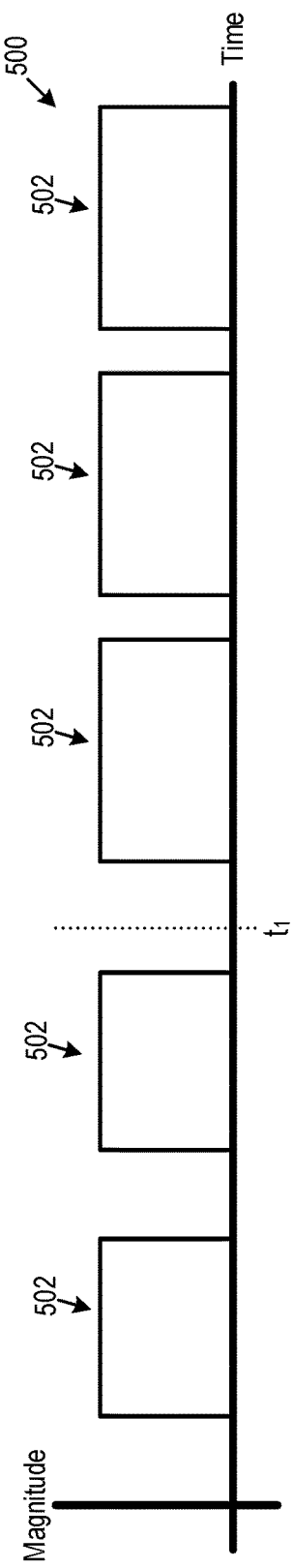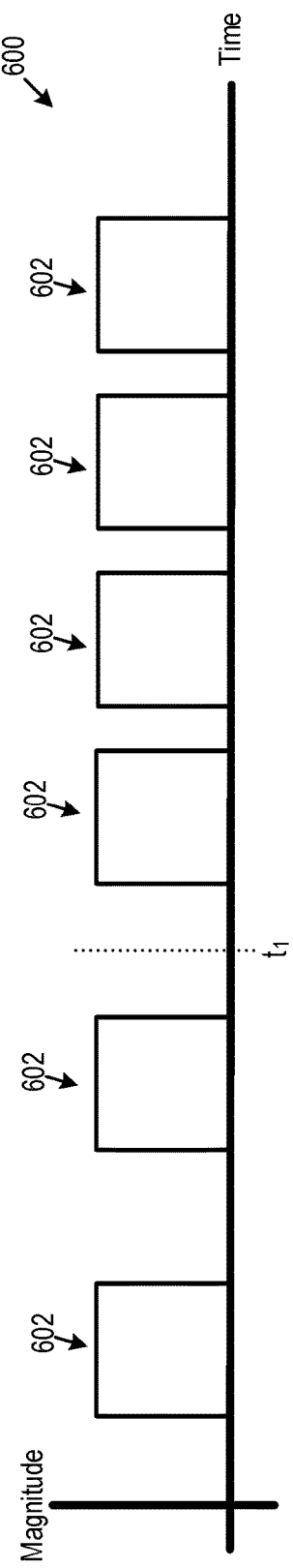

BATTERY CHARGERS AND ASSOCIATED SYSTEMS AND METHODS

RELATED APPLICATIONS

This application claims benefit of priority to U.S. Provisional Patent Application Ser. No. 62/584,503, filed on Nov. 10, 2017, which is incorporated herein by reference.

BACKGROUND

Batteries are used to provide electrical power in a wide variety of applications. A battery includes one or more electrochemical cells which store energy in chemical form. This stored energy is converted to electrical energy via a redox chemical reaction when an electrical load is connected to the battery. Some batteries are intended for single-use and are discarded after their stored energy is depleted. Such batteries are referred to as primary batteries. Other batteries can be recharged after their stored energy is depleted, and these batteries are referred to as secondary batteries.

One popular secondary battery is a lithium-ion battery, which includes one or more lithium-ion electrochemical cells. Each lithium-ion electrochemical cell includes an anode, a cathode, and electrolyte separating the anode and cathode. Lithium ions move through the electrolyte from the anode to the cathode during cell discharging, and lithium ions move through the electrolyte from the cathode to the anode during cell charging. Lithium-ion batteries advantageously have a high energy density, negligible memory effect, and low rate of self-discharge. However, the batteries have some significant drawbacks.

For example, lithium-ion batteries can be easily damaged by overcharging, potentially resulting in battery leakage, fire, and/or explosion. Therefore, it is critical that the batteries not be overcharged. Additionally, lithium-ion batteries can be damaged when used outside of their intended voltage range. Thus, power management circuitry must ensure that voltage of lithium-ion batteries remains within an acceptable range at all times. Furthermore, the batteries degrade over time, such as due to chemical reactions in the anodes and cathodes of constituent electrochemical cells, resulting in reduced battery capacity and increased likelihood of catastrophic battery failure.

BRIEF DESCRIPTION OF THE DRAWINGS

FIG. 4 illustrates an example of the FIG. 3 battery charger controlling charging of a battery, according to an embodiment.

FIG. 5 illustrates another example of the FIG. 3 battery charger controlling charging of a battery, according to an embodiment.

FIG. 6 illustrates yet another example of the FIG. 3 battery charger controlling charging of a battery, according to an embodiment.

DETAILED DESCRIPTION OF THE EMBODIMENTS

Figure 1:
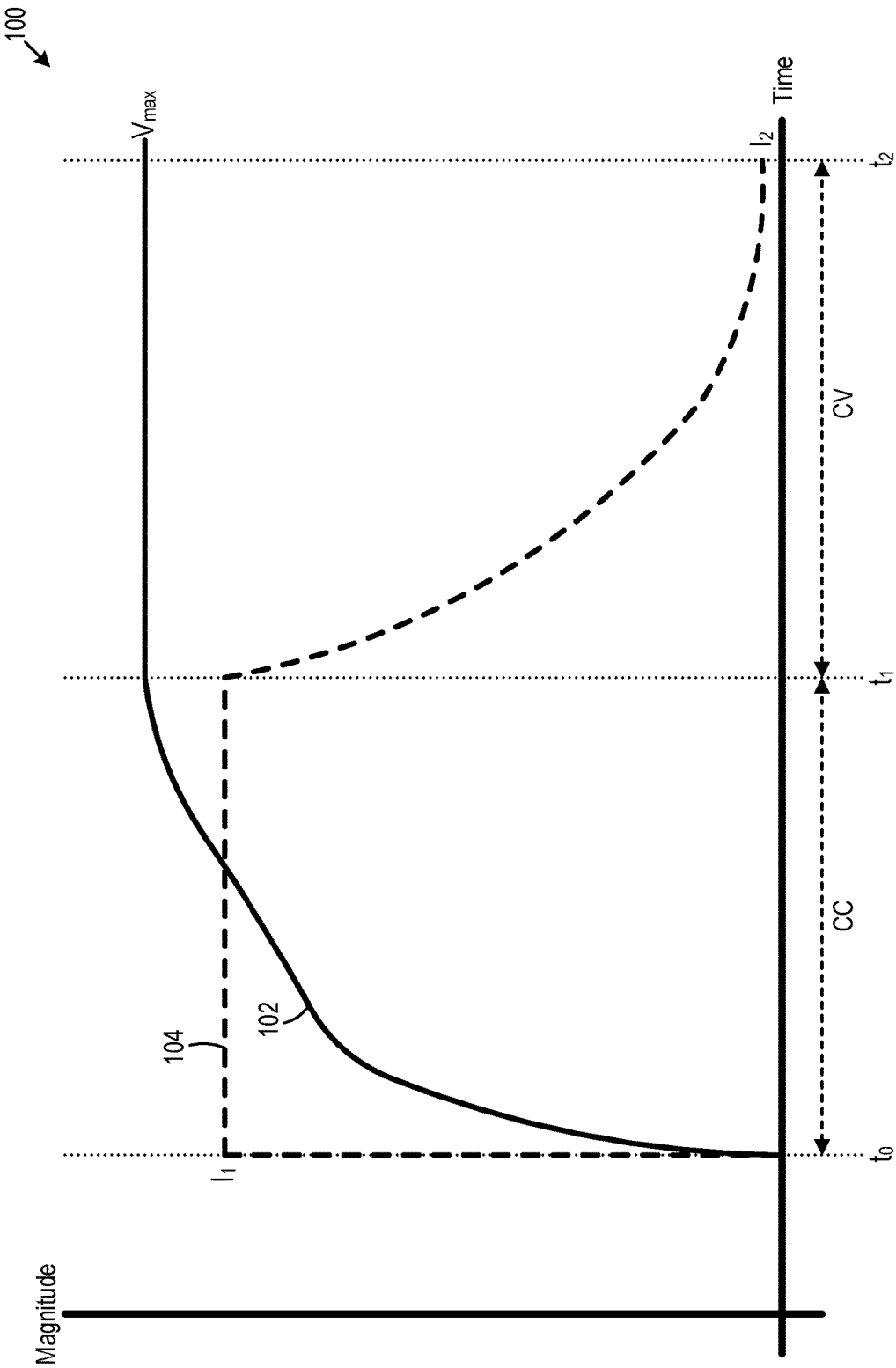
FIG. 1 illustrates a conventional method for charging a lithium-ion battery.

A lithium-ion battery is conventionally charged using a constant current-constant voltage (CCCV) charging method. The CCCV charging method consists of a constant current (CC) stage followed by a constant voltage (CV) stage. Current of fixed magnitude is applied to the battery during the CC stage, and a voltage of fixed magnitude is applied to the battery during the CV stage. FIG. 1 is a graph 100 illustrating one example of the CCCV charging method, where the vertical axis represents magnitude and the horizontal axis represents time. Graph 100 includes curves representing voltage 102 across the battery and current 104 into the battery. Charging begins at time to with the CC stage, and battery current 104 is fixed at value $I_1$ during the CC stage. The CC stage continues until time t1 when battery voltage 102 reaches a maximum value $V_{max}$ and the CV stage begins. Battery voltage 102 is fixed at $V_{max}$ during the CV stage. The CV stage continues until time $t_2$ when battery current 104 drops to a minimum threshold value 12 and charging ends.

Although the CCCV charging method is relatively simple to implement, it has significant shortcomings. For example, in many situations, the CCCV method will charge a battery at an unnecessarily slow rate. In particular, it is desirable that current $I_1$ during the CC stage be as large as possible to quickly charge the battery. However, too large of a value of $I_1$ will damage the battery. Additionally, the maximum permissible value of $I_1$ varies from battery-to-battery due to a number of factors, such as variations in battery manufacturing. Furthermore, the maximum permissible value of $I_1$ may change as the battery ages and as battery operating conditions change. Therefore, the value of $I_1$ is chosen so that the battery will not be overcharged under worst-case conditions, resulting in $I_1$ being lower than necessary under most conditions. Such non-optimal value of $I_1$ causes the battery to be charged at an unnecessarily slow rate under most circumstances.

Additionally, as evident from FIG. 1, a battery spends significant time at maximum voltage $V_{max}$ during CCCV charging. This high voltage degrades the battery over time, and the CCCV charging method is therefore detrimental to battery longevity.

Applicant has developed battery chargers and associated systems and methods which at least partially overcome one or more of the problems discussed above with conventional charging techniques. These new battery chargers implement a pulse charging method where battery charging is controlled at least partially based on concentration stress ($c_{stress}$) of the battery, where $c_{stress}$ is a concentration gradient of ions in the battery, e.g., a lithium ion concentration gradient in the case of a lithium-ion battery. Consequently, certain embodiments of the battery chargers are capable of optimizing battery charging for a particular battery under its current operating conditions, thereby potentially achieving faster battery charging and/or longer battery life than possible using conventional battery charging techniques.

Figure 2:
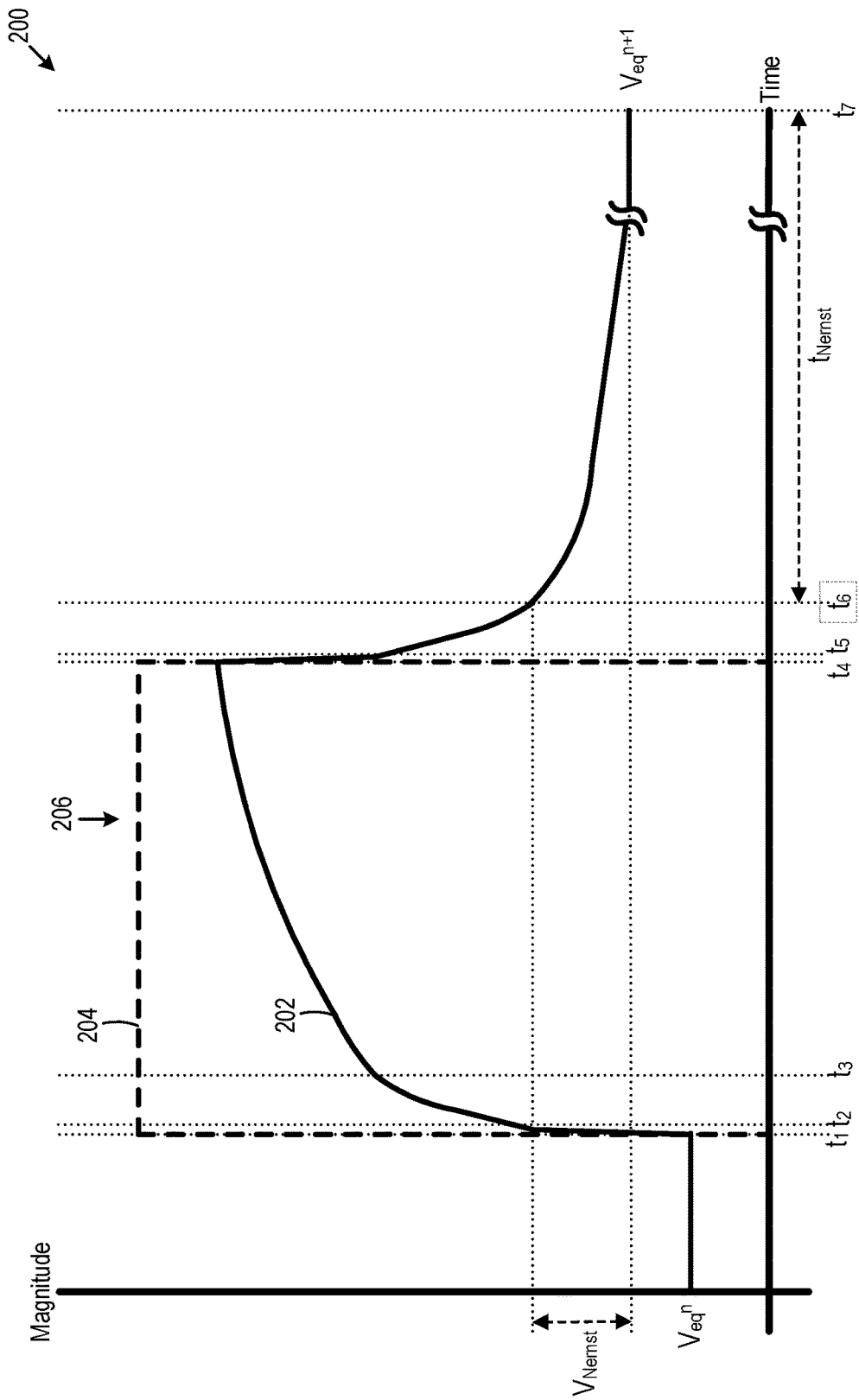
FIG. 2 illustrates a charging current pulse applied to a lithium-ion battery.

To help understand the battery charging methods of the new battery chargers, consider graph 200 of FIG. 2, which illustrates a charging current pulse applied to a lithium-ion battery. The vertical axis of graph 200 represents magnitude, and the horizontal axis of the graph represents time. Graph 200 includes respective curves representing voltage 202 across the battery and current 204 into the battery. Battery voltage 202 is at equilibrium value $V_{eq}^n$ at time $t_1$ when a charging current pulse 206 is applied to the battery. Battery voltage 202 rises very quickly from time $t_1$ to $t_2$ due to ohmic over-voltage effects in the battery, and battery voltage 202 rises quickly from time $t_2$ to $t_3$ due to activation over-voltage effects in the battery. Battery voltage 202 continues to rise from time $t_3$ to $t_4$ as lithium ions are transferred from the cathode to the anode in the electrochemical cell(s) of the battery.

Charging current pulse 206 terminates at time $t_4$, and battery voltage 202 falls very quickly from time $t_4$ to $t_5$ due to ohmic over-voltage effects in the battery, and battery voltage 202 falls quickly from time $t_5$ to $t_6$ due to activation over-voltage effects in the battery. Battery voltage 202 slowly falls during time period $t_{Nernst}$, which is time from time $t_6$ to $t_7$. The battery's lithium ion concentration reaches equilibrium state at time $t_7$, and battery voltage 202 is at a new equilibrium value $V_{eq}^{n+1}$ at time $t_7$. Equilibrium voltage $V_{eq}^{n+1}$ is higher than equilibrium voltage $V_{eq}^n$ due to energy delivered to the battery by charging current pulse 206. It should be noted that FIG. 2 is not drawn to scale in that time period $t_{Nernst}$ is typically very long, such as an hour or more, while the time period from time $t_1$ to time $t_6$ is much shorter.

$C_{stress}$ can be determined from battery voltage 202 changes due to activation over-voltage effects, i.e., battery voltage 202 from times $t_5$ to $t_6$. However, significant data collection resources are required to obtain this data, and $C_{stress}$ can only be indirectly determined from activation over-voltage. Consequently, significant data collection and processing resources are required to determine $C_{stress}$ from activation over-voltage effects.

Applicant has determined that $C_{stress}$ can instead be determined from the difference in battery voltage 202 between times $t_6$ and $t_7$, referred to as $V_{Nernst}$. $V_{Nernst}$ is related to $C_{stress}$ as follows, where $C_{eq}$ is battery ion concentration at equilibrium, R is the gas constant, T is temperature, n is number of electrons participating in the redox reaction of the battery, and F is Faraday's constant:

$$C_{stress} = C_{eq} e^{V_{Nernst} \frac{nF}{RT}} \quad \text{(Eqn. 1)}$$

$C_{eq}$ and n can be determined for a particular battery, and T can be measured or estimated. Accordingly, $C_{stress}$ can be determined if $V_{Nernst}$ is known. Additionally, changes in $C_{stress}$ can determined simply from a change in $V_{Nernst}$ assuming that T remains unchanged. T will typically not significantly vary over short time periods due to large battery thermal mass. Additionally, T can be measured during operation. Consequently, battery charging can be controlled based on $C_{stress}$ by controlling charging based on $V_{Nernst}$.

As discussed above, time period $t_{Nernst}$ is very long, and therefore, it would not be practical to measure battery voltage 202 at time $t_7$ after each charging current pulse 206, because doing so would typically require waiting an hour or more after each charging current pulse for lithium ion concentration in the battery to equalize. Applicant has found, however, that battery voltage 202 at time $t_7$ is commonly available from battery management circuitry. For example, battery management circuitry often includes a "fuel gauge" to determine energy remaining in a battery, and the fuel gauge is typically configured to estimate battery open-circuit voltage at equilibrium, i.e., battery voltage 202 at time $t_7$, when determining remaining energy. Therefore, $V_{Nernst}$ can be determined from (a) measured battery voltage 202 at time $t_6$ and (b) estimated battery open-circuit voltage at time $t_7$, without needing to wait for battery ion concentration to equalize after each charging current pulse.

Figure 3:
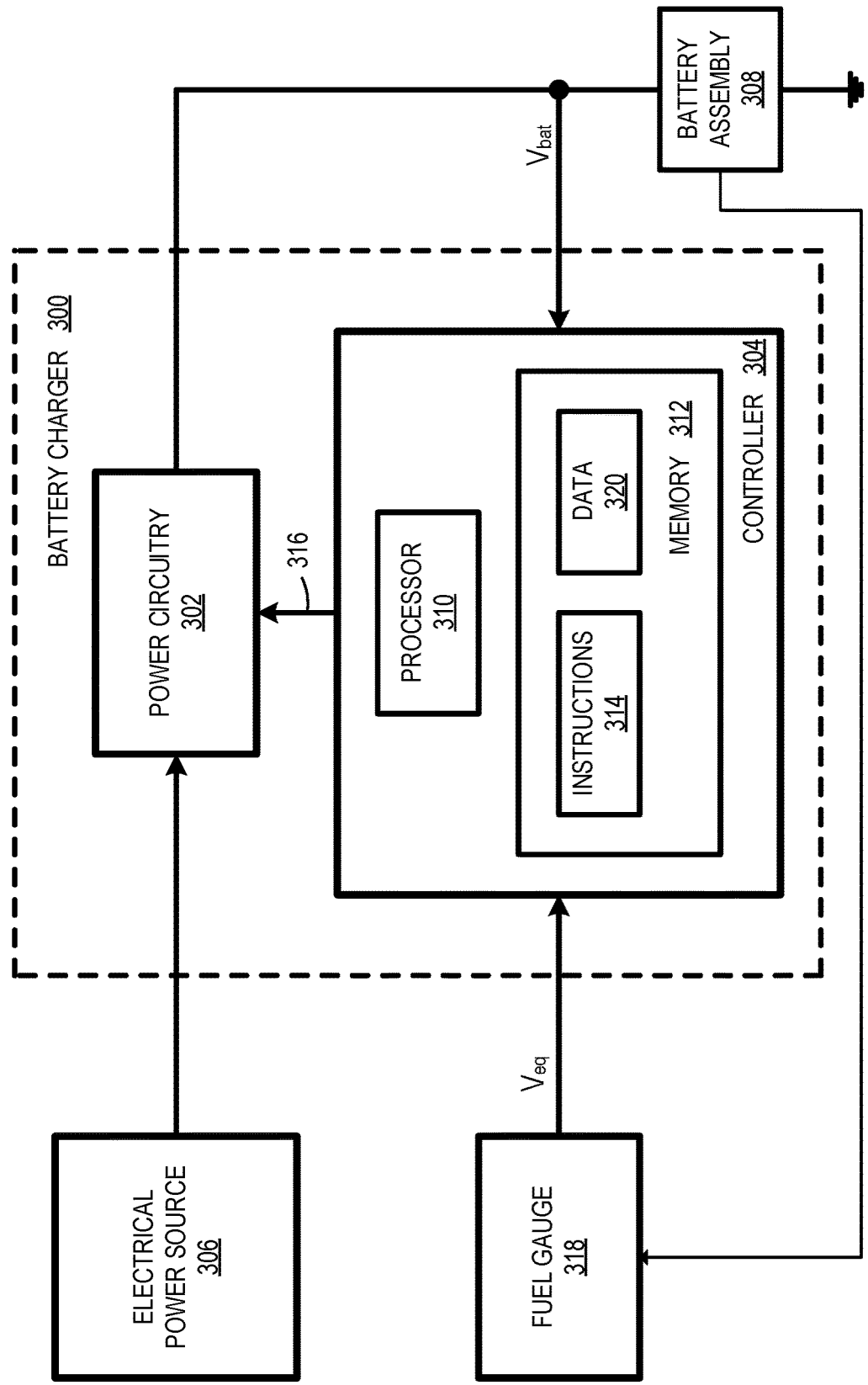
FIG. 3 illustrates a battery charger, according to an embodiment.

FIG. 3 illustrates a battery charger 300, which controls battery charging based on $C_{stress}$. Battery charger 300 includes power circuitry 302 and a controller 304. Power circuitry 302 receives electrical power from an electrical power source 306, and power circuitry 302 is configured to charge one or more batteries (not shown) of a battery assembly 308 by repeatedly applying charging current pulses to battery assembly 308. In some embodiments, battery assembly 308 further includes additional circuitry (not shown), such as circuitry for measuring current through battery assembly 308 and/or circuitry for measuring voltage across battery assembly 308. Electrical power source 306 could be either an alternating current (AC) electrical power source or a direct current (DC) electrical power source. In some embodiments, power circuitry 302 includes a switching power converter, such as a buck converter or a boost converter, to apply charging current pulses to battery assembly 308. Alternately or additionally, power circuitry 302 may include a linear regulator to regulate magnitude of voltage applied to battery assembly 308. In some embodiments, power circuitry 302 controls flow of electrical power to battery assembly 308 simply by opening and closing a switch electrically coupled in series or in parallel with battery assembly 308. In particular embodiments, battery charger 300 is intended for use with one or more lithium-ion batteries, i.e., battery assembly 308 includes one or more lithium-ion batteries, but battery charger 300 could be adapted to work with other battery types without departing from the scope hereof.

Controller 304 is configured to control charging of the one or more batteries of battery assembly 308 at least partially based on $C_{stress}$ of the one or more batteries, such that controller 304 uses $C_{stress}$ as a feedback parameter. Accordingly, battery charger 300 operates in a closed-loop fashion. Controller 304 includes a processor 310 and a memory 312. Processor 310 execute instructions 314 in the form of firmware or software stored in memory 312 to generate a power signal 316 for controlling power circuitry 302, such that controller 304 controls charging of the one or more batteries of battery assembly 308. In particular, controller 304 samples voltage $V_{bat}$ across battery assembly 308 after a charging current pulse and a subsequent short relaxation period, such as after change in $V_{bat}$ due to ohmic and activation over-voltage effects. For example, in some embodiments, controller 304 samples voltage $V_{bat}$ at time $t_6$ in FIG. 2. In certain embodiments, controller 304 includes circuitry (not shown) for (a) storing a sample of voltage $V_{bat}$ and (b) digitizing the stored sample, for use by processor 310. Controller 304 also receives estimated battery open-circuit equilibrium voltage $V_{eq}$, such as estimated battery voltage at time $t_7$ in FIG. 2, from a fuel gauge 318. Fuel gauge 318 determines open-circuit equilibrium voltage $V_{eq}$. Processor 310 then executes instructions 314 to determine $V_{Nernst}$ using EQN. 2 below or a variation thereof.

$$V_{Nernst} = V_{bat} - V_{eq} \tag{EQN. 2}$$

As discussed above with respect to EQN. 1, changes in $V_{Nernst}$ represent changes in $C_{stress}$ assuming battery temperature remains unchanged. Accordingly, processor 310 executes instructions 314 to control charging of the one or more batteries of battery assembly 308 based at least partially on $V_{Nernst}$, thereby controlling charging of the one or more batteries based on $C_{stress}$. For example, in some embodiments, processor 310 compares $V_{Nernst}$ to one or more threshold values, and processor 310 varies charging rate of the one or more batteries of battery assembly 308 in response to $V_{Nernst}$ crossing the one or more threshold values. For instance, in some embodiments, processor 310 increases rate of charging of the one or more batteries in response to $V_{Nernst}$ dropping below a first threshold value, and processor 310 decreases rate of charging of the one or more batteries in response to $V_{Nernst}$ rising above a second threshold value. The first and second threshold values may be the same or different.

Processor 310 repeatedly executes the steps discussed above to repeatedly determine $V_{Nernst}$ and control battery charging according to $V_{Nernst}$. For example, in some embodiments, processor 310 determines $V_{Nernst}$ after each charging current pulse, while in some other embodiments, processor 310 determines $V_{Nernst}$ less frequently, such as after every N charging current pulses, where N is an integer greater than one. Several examples of possible operating methods of charger 300 are discussed below with respect to FIGS. 9-12. The ability to control charging according to $V_{Nernst}$ enables battery charger 308 to be optimized for fast battery charging and/or for battery longevity, as discussed below. In some embodiments, controller 304 is further configured to control charging of the one or more batteries of battery assembly 308 such that battery voltage $V_{bat}$ does not exceed a maximum permissible voltage of battery assembly 308. Furthermore, in some embodiments, controller 304 uses ohmic and activation over-voltage along with $V_{Nernst}$ to determine pulse shape, current magnitude, and time length of a next charging event.

In particular embodiments, power circuitry 302 controls charging of the one or more batteries of battery assembly 308 according to power signal 316 from controller 304 by varying amplitude of charging current pulses, by varying duty cycle of charging current pulses, and/or by varying frequency of charging current pulses. FIGS. 4-6 illustrate several examples of battery charger 300 controlling charging of the one or more batteries of battery assembly 308 at least partially based on $V_{Nernst}$. Specifically, FIG. 4 is a graph 400 of charging current pulse 402 magnitude verses time. Power circuitry 302 repeatedly generates charging current pulses 402 under the control of controller 304. At time $t_1$, processor 310 determines that $V_{Nernst}$ has risen above a threshold value, and in response, processor 310 controls power circuitry 302 to decrease magnitude of charging current pulses 402, thereby decreasing charging rate of the one or more batteries of battery assembly 308.

FIG. 5 is a graph 500 of charging current pulse 502 magnitude verses time. At time $t_1$, processor 310 determines that $V_{Nernst}$ has fallen below a threshold value, and in response, processor 310 controls power circuitry 302 to increase duty cycle of charging current pulses 502, thereby increasing charging rate of the one or more batteries of battery assembly 308. FIG. 6, in turn, is a graph 600 of charging current pulse 602 magnitude verses time. At time $t_1$, processor 310 determines that $V_{Nernst}$ has fallen below a threshold value, and in response, processor 310 controls power circuitry 302 to increase frequency of charging current pulses 602, thereby increasing charging rate of the one or more batteries of battery assembly 308.

Figure 7:
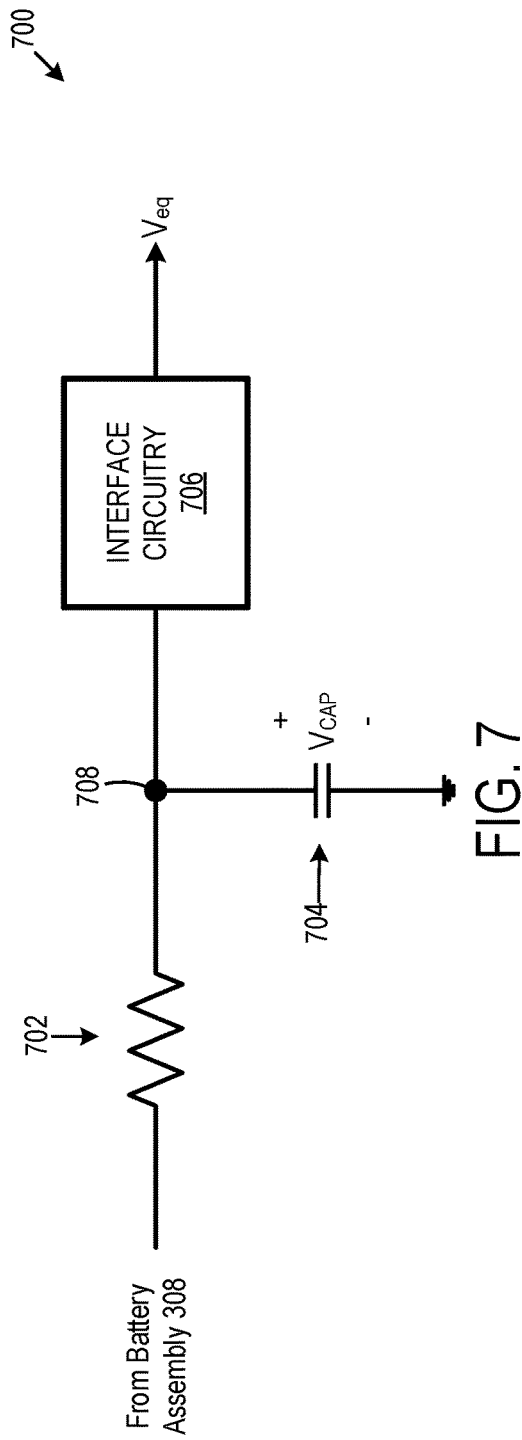
FIG. 7 illustrates a fuel gauge configured to provide an estimated equilibrium voltage.

FIG. 7 illustrates a fuel gauge 700, which is one possible implementation of fuel gauge 318 (FIG. 3). It should be understood, however, that fuel gauge 318 is not limited to the FIG. 7 implementation but instead could be implemented in any other manner as long as fuel gauge 318 is capable of providing estimated equilibrium voltage $V_{eq}$ to controller 304. Furthermore, fuel gauge 318 could be replaced with another device providing equilibrium voltage $V_{eq}$ without departing from the scope hereof.

Fuel gauge 700 includes a resistor 702, a capacitor 704, and interface circuitry 706. Resistor 702 is electrically coupled between battery assembly 308 and capacitor 704 at a node 708, and interface circuitry 706 is electrically coupled to node 708. Applicant has found that voltage $V_{cap}$ across capacitor 704 largely tracks equilibrium voltage of battery assembly 308 and is largely unaffected by load on battery assembly 308. Thus, fuel gauge 700 outputs estimated equilibrium voltage $V_{eq}$ in proportion to voltage across capacitor 704, i.e., voltage at node 708. Interface circuitry 706 electrically interfaces node 708 with controller 304. In some embodiments, interface circuitry 706 includes sampling circuitry for sampling voltage at node 308 and an analog-to-digital converter for digitizing the sampled voltage.

Resistor 702 and capacitor 704 could be replaced by, or supplemented with, other circuitry providing an integration function. Additionally, the integration achieved by resistor 702 and capacitor 704 could alternately be achieved using digital filtering techniques without departing from the scope hereof.

Although FIG. 3 illustrates controller 304 and power circuitry 302 being separate elements, power circuitry 302 and controller 304 could be at least partially combined without departing from the scope hereof. Additionally, controller 304 could be modified to further include fuel gauge 318. For example, instructions 314 could be supplemented so that processor 310 executes instructions 314 to generate estimated equilibrium voltage $V_{eq}$, such that processor 310 takes the place of fuel gauge 318. Furthermore, processor 310 and memory 312 could be replaced with or supplemented by analog circuitry. For example, in certain alternate embodiments, processor 310 and memory 312 are replaced by an analog computer.

In some alternate embodiments, controller 304 is further configured to control charging of the one or more batteries of battery assembly 308 based on both activation over-voltage of the battery and $V_{Nernst}$. For example, in certain embodiments, controller 304 controls charging of the one or more batteries of battery assembly 308 according to $V_{fb}$, which is determined as follows, where $V_{resistivity}$ and $V_{activation}$ are determined from battery voltage 202 between times $t_4$ and $t_6$ in FIG. 2:

$$V_{fb} = V_{Nernst} - V_{resistivity} - V_{activation} \quad \text{(EQN. 3)}$$

$V_{resistivity}$ and $V_{activation}$ are determined from $V_{bat}$, for example, in accordance with their respective relaxation time constants, which can be determined during battery characterization. A typical time constant for $V_{resistivity}$ is less than a microsecond, and a typical time constant for $V_{activation}$ is in the millisecond regime.

Controlling charging of the one or more batteries of battery assembly 308 based on both activation over-voltage and $V_{Nernst}$ can advantageously achieve tighter regulation of $C_{stress}$ during battery charging than that achievable by controlling charging based on $V_{Nernst}$ alone. Additionally, knowledge of voltage at time $t_4$ can be used to ensure that voltage across battery assembly 308 does not exceed a maximum permissible voltage of battery assembly 308. However, determining $C_{stress}$ from activation over-voltage effects increases processing and data collection requirements of controller 304.

Figure 8:
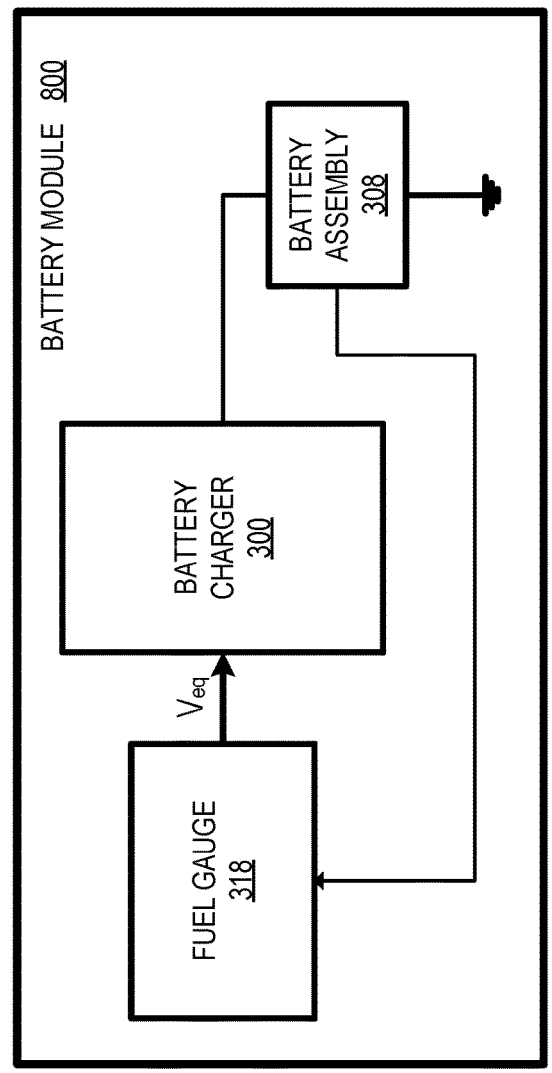
FIG. 8 illustrates a battery module including an instance of the FIG. 3 battery charger, according to an embodiment.

Battery charger 300 could be co-packaged with other components. For example, FIG. 8 illustrates a battery module 800 including battery charger 300 co-packaged with an instance of battery assembly 308 and fuel gauge 318. Battery charger 300 is electrically coupled to battery assembly 308. Details of battery charger 300 are not shown in FIG. 8 to promote illustrative clarity.

Controller 304's use of $V_{Nernst}$ to control charging of battery assembly 308 can achieve significant advantages. For example, in some embodiments, controller 304 is configured to control charging of the one or more batteries of battery assembly 308 such that $C_{stress}$, as represented by $V_{Nernst}$, is at or slightly below a maximum permissible value of $C_{stress}$ for battery assembly 308, such that controller 304 is optimized for fast charging. Charging the one or more batteries of battery assembly 308 in such manner minimizes battery charging time by maximizing rate of battery charging while preventing battery damage. CCCV charging techniques typically cannot achieve such fast charging because battery charging current must be sufficiently low to prevent battery damage under worst case conditions, as discussed above.

As another example, in some other embodiments, controller 304 is configured to charge the one or more batteries of battery assembly 308 such that $C_{stress}$, as represented by $V_{Nernst}$, is significantly below the maximum permissible value of $C_{stress}$ for the one or more batteries, to optimize controller 304 for battery longevity. Charging battery assembly 308 in such manner promotes battery longevity by reducing charging-induced stress in the one or more batteries of battery assembly 308 and by helping reduce time that the one or more batteries are exposed to high voltage. CCCV charging techniques typically cannot achieve such battery longevity because of their relatively long CV stage which subjects a battery to prolonged high voltage.

As yet another example, in particular embodiments, controller 304 is configured to charge the one or more batteries of battery assembly 308 such that $C_{stress}$ represented by $V_{Nernst}$, varies during charging of the one or more batteries.

For instance, in some embodiments, controller 304 controls charging of the one or more batteries of battery assembly 308 such that $C_{stress}$ is relatively high at the beginning of the battery charging process and such that $C_{stress}$ is reduced later in the battery charging process. Charging battery assembly 308 in such manner promotes both fast charging and long life of battery assembly 308. In particular, concentration $C_{stress}$ gradient of a battery is typically relatively low at low battery state of charge, and therefore, can be large at the beginning of the battery charging process to promote fast charging without degrading battery life. However, a battery is more susceptible to damage near the end of the battery charging process, and reducing $C_{stress}$ as the battery charging process progresses reduces likelihood of battery degradation from excessive battery stress, thereby promoting battery longevity.

Discussed below with respect to FIGS. 9-12 are several examples of how a battery can be charged using the new battery charging techniques developed by Applicant. Although the exemplary methods are discussed with respect to battery charger 300 of FIG. 3, the examples are not limited to use with battery charger 300. To the contrary, the methods could be used with other battery chargers which determine $V_{Nernst}$. Additionally, battery charger 300 is not limited to use with the following methods.

Figure 9:
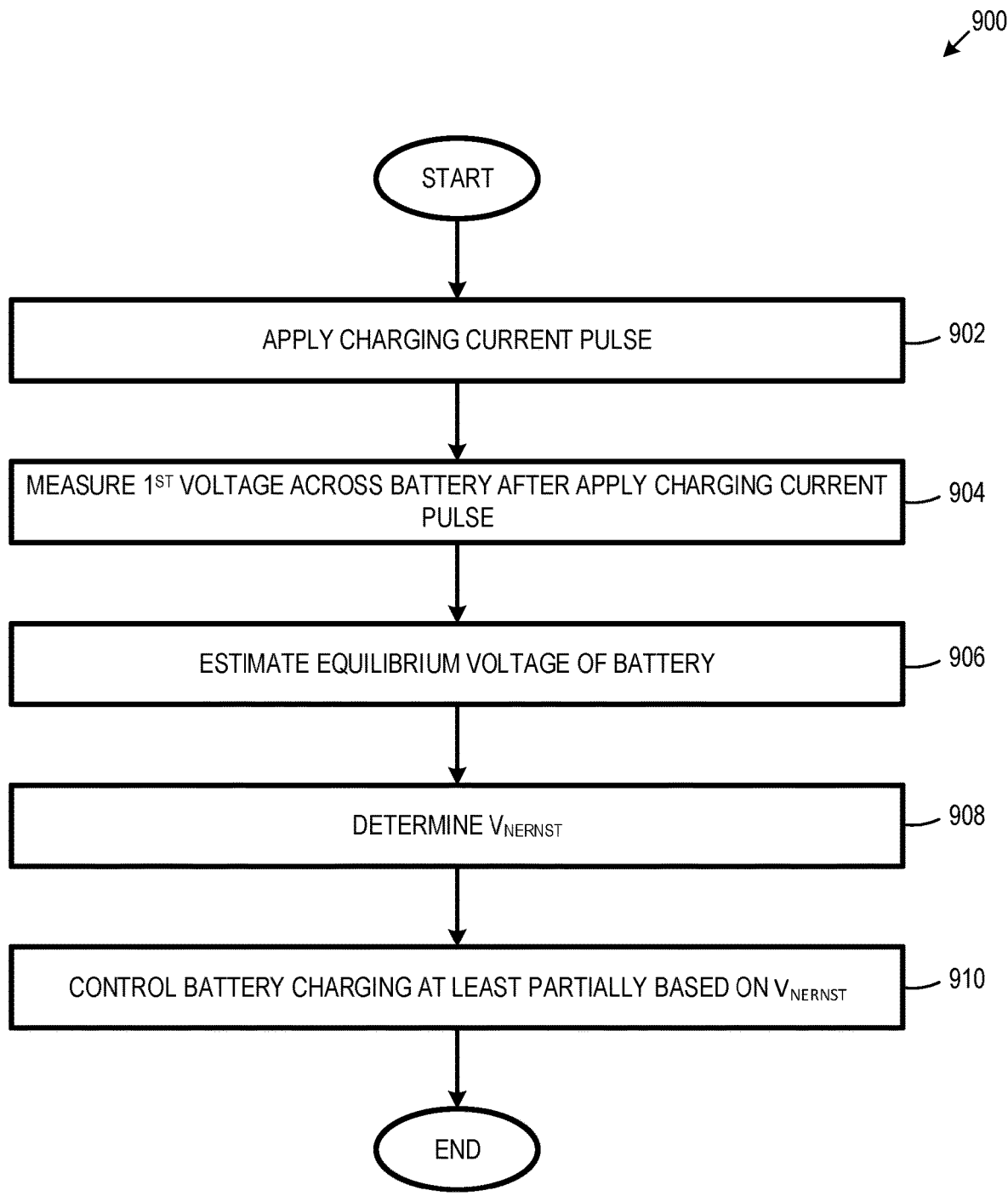
FIG. 9 illustrates a method for charging a battery, according to an embodiment.

FIG. 9 illustrates a method 900 for charging a battery. Method 900 begins with a step 902 of applying a charging current pulse to a battery. In one example of step 902, power circuitry 302 applies a charging current pulse to battery assembly 308, such as charging current pulse 402, 502, or 602 of FIGS. 4-6, respectively. In step 904, a first voltage is measured across the battery, after the step of applying the charging current pulse to the battery. In one example of step 904, controller 304 measures voltage $V_{bat}$ across battery assembly 308 after the charging current pulse and a subsequent short relaxation period, such as at time $t_6$ of FIG. 2. In step 906, an equilibrium voltage of the battery is estimated. In one example of step 906, fuel gauge 318 provides estimated equilibrium voltage $V_{eq}$, i.e., estimated voltage $V_{bat}$ at time $t_7$ of FIG. 2. In step 908, $V_{Nernst}$ of the battery is determined from at least a difference between the first voltage and the equilibrium voltage. In one example of step 908, processor 310 executes instructions 314 to determine $V_{Nernst}$ from $V_{bat}$ and $V_{eq}$ using EQN. 2. In step 910, charging of the battery is controlled at least partially based on $V_{Nernst}$. In one example of step 910, processor 310 controls power circuitry 302 to control charging of battery assembly 308 based at least partially on $V_{Nernst}$ by controlling at least one of magnitude, duty cycle, and frequency of charging pulses to battery assembly 308. Method 900 optionally repeats until the battery is fully charged.

Figure 10:
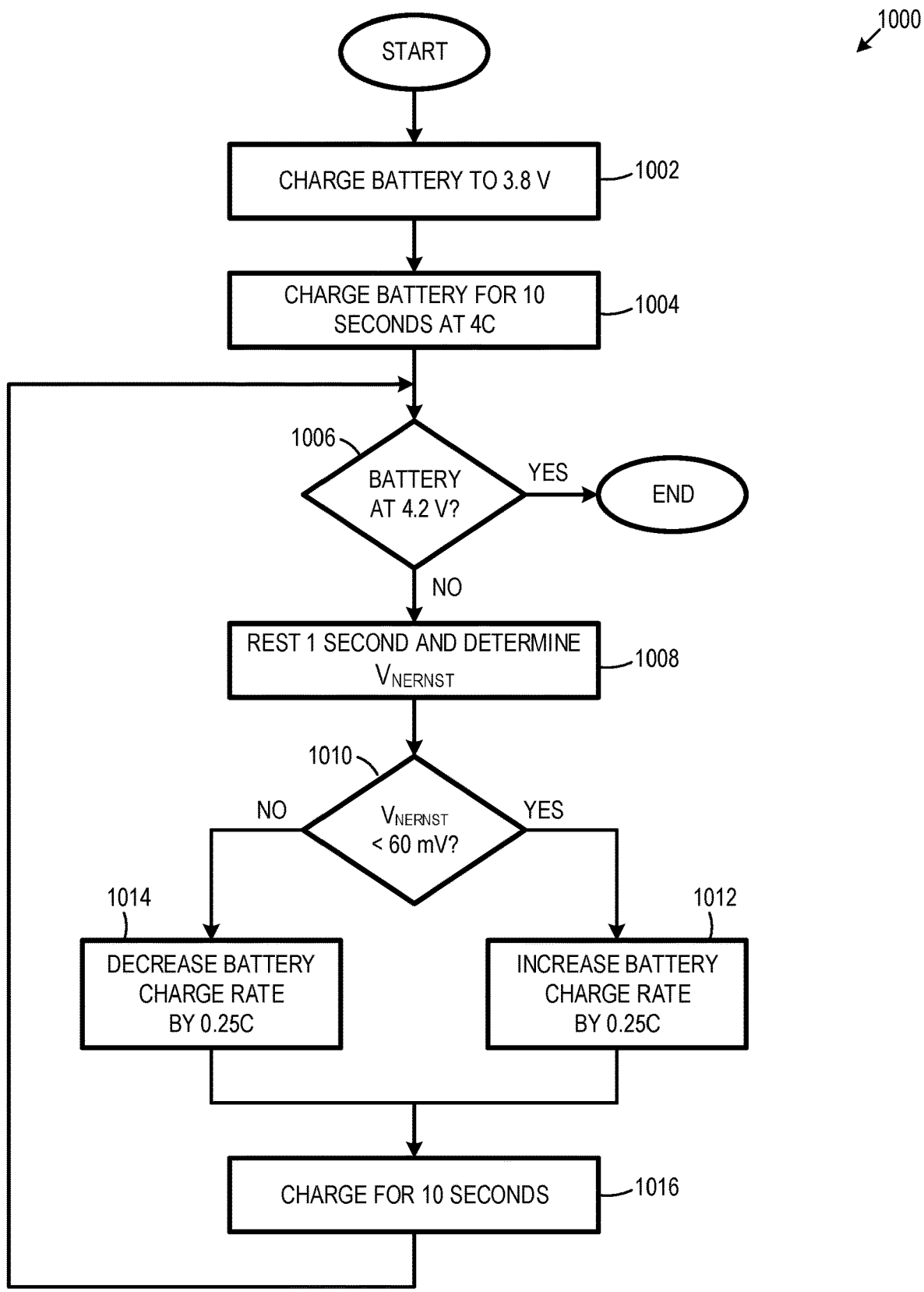
FIG. 10 illustrates another method for charging a battery, according to an embodiment.

FIG. 10 illustrates another method 1000 for charging a battery. In step 1002, the battery is charged to 3.8 volts. In one example of step 1002, power circuitry 302 applies charging current pulses to battery assembly 308 until battery voltage $V_{bat}$ reaches 3.8 volts. In step 1004, the battery is charged for 10 seconds at charging rate of 4 C. In one example of step 1004, power circuitry 302 applies a 4 C charging current pulse to battery assembly 308 for 10 seconds. The term "C" in this context means a charging rate equivalent to the capacity of the battery. For example, a 3 ampere-hour battery charged with a 3 ampere current source would be charged at a 1 C rate, and the 3 ampere-hour battery charged with a 12 ampere current source would be charged at a 4 C rate.

Step 1006 determines if the battery has reached 4.2 volts. If yes, method 1000 ends, and if no, method 1000 continues to step 1008. In one example of step 1006, controller 304 determines whether battery voltage $V_{bat}$ has reached 4.2 volts. In step 1008, the battery is allowed to "rest" for one second, i.e., the battery is not charged for one second, and then $V_{Nernst}$ is determined. In one example of step 1008, power circuitry 302 discontinues charging of battery assembly 308 for one second, and controller 304 determines $V_{Nernst}$ of battery assembly 308. Step 1010 determines if $V_{Nernst}$ is less than 60 millivolts. If yes, method 1000 proceeds to step 1012, and if no, method 1000 proceeds to step 1014. In one example of step 1010, controller 304 compares $V_{Nernst}$ to a 60 millivolt threshold. In step 1012, the battery charge rate is increased by 0.25 C, and in step 1014, the battery charge rate is decreased by 0.25 C. In one example of step 1012, power circuitry 302 increases charging rate of battery assembly 308 by 0.25 C, and in one example of step 1014, power circuitry 302 decreases charging rate of battery assembly 308 by 0.25 C. Method 1000 proceeds from each of steps 1012 and 1014 to step 1016 where the battery is charged for 10 seconds. In one example of step 1016, power circuitry 302 charges battery assembly 308 for 10 seconds. Method 1000 returns to step 1006 from step 1016.

Method 1000 maintains $C_{stress}$ at an approximately constant value when charging a battery, i.e., it maintains $C_{stress}$ at a value approximately corresponding to $V_{Nernst}$ of 60 mV for the battery being charged. The value of $C_{stress}$ corresponding to $V_{Nernst}$ for the battery being charged can be determined from EQN. 1. Method 1000 could be optimized for faster charging by selecting a high value of $V_{Nernst}$ in comparison step 1010, and method 1000 could be optimized for long battery life by selecting a low value of $V_{Nernst}$ in comparison step 1010.

Figure 11:
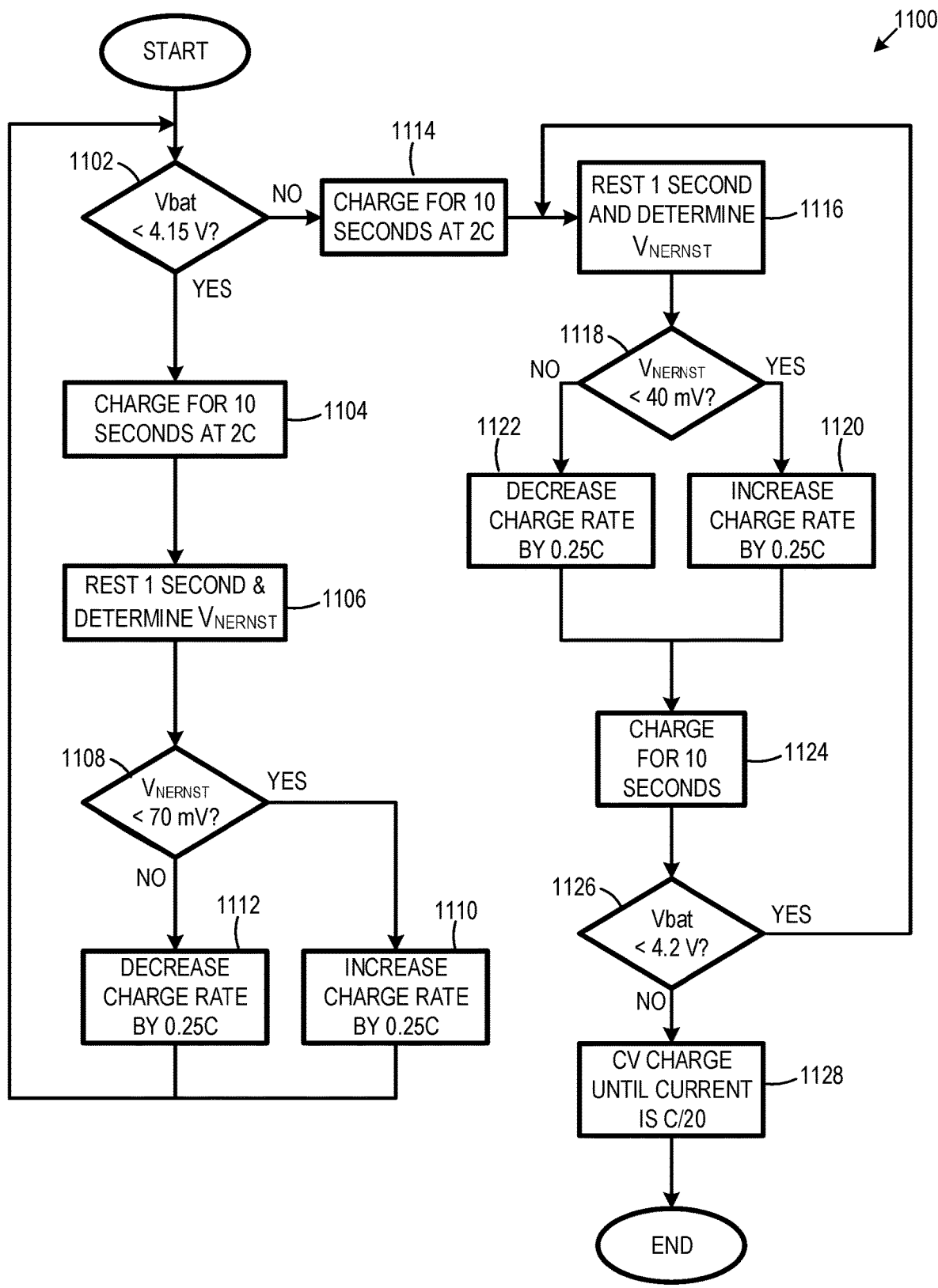
FIG. 11 illustrates a method for charging a battery where the battery is charged at 90 percent duty cycle, according to an embodiment.
Figure 12:
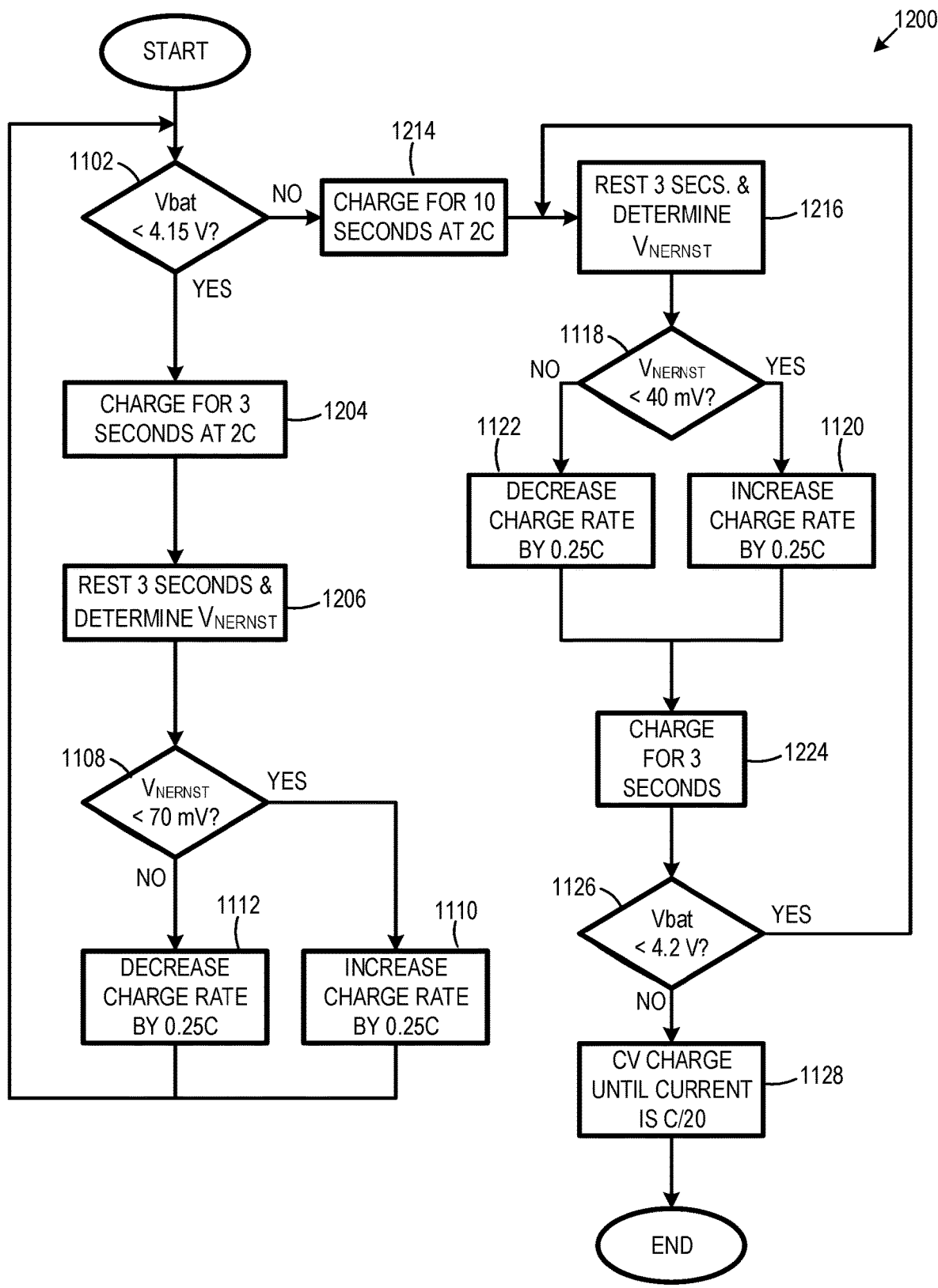
FIG. 12 illustrates a method for charging a battery where the battery is charged at 50 percent duty cycle, according to an embodiment.

FIGS. 11 and 12 respectively illustrate methods 1100 and 1200 where $C_{stress}$ is maintained at a high value during early stages of battery charging and where $C_{stress}$ is maintained at a low value during later stages of battery charging. In particular, $C_{stress}$ is maintained at a value approximately corresponding to $V_{Nernst}$ of 70 mV when battery voltage is less than 4.15 volts, and $C_{stress}$ is maintained at a value approximately corresponding to $V_{Nernst}$ of 40 mV when battery voltage is greater than or substantially equal to 4.15 volts, for example.

In method 1100 of FIG. 11, the battery is charged at 90 percent duty cycle. Method 1100 begins with step 1102 of determining if battery voltage is less than 4.15 volts. If yes, method 1100 proceeds to step 1104, and if no, method 1100 proceeds to step 1114. In one example of step 1102, controller 304 determines whether battery voltage $V_{bat}$ is less than 4.15 volts. In step 1104, the battery is charged for 10 seconds at a charging rate of 2 C. In one example of step 1104, power circuitry 302 applies a 2 C charging current pulse to battery assembly 308 for 10 seconds. In step 1106, the battery is allowed to rest for 1 second and $V_{Nernst}$ is determined. In one example of step 1106, power circuitry 302 discontinues charging battery assembly 308 for one second and controller 304 determines $V_{Nernst}$ of battery assembly 308.

Step 1108 determines if $V_{Nernst}$ is less than 70 millivolts. If yes, method 1100 proceeds to step 1110, and if no, method 1100 proceeds to step 1112. In one example of step 1108, controller 304 compares $V_{Nernst}$ to a 70 millivolt threshold. In step 1110, the battery charge rate is increased by 0.25 C, and in step 1112, the battery charge rate is decreased by 0.25 C. In one example of step 1110, power circuitry 302 increases charging rate of battery assembly 308 by 0.25 C, and in one example of step 1112, power circuitry 302 decreases charging rate of battery assembly 308 by 0.25 C. Method 1100 returns from each of steps 1110 and 1112 to step 1102.

In step 1114, the battery is charged for 10 seconds at a charging rate of 2 C. In one example of step 1114, power circuitry 302 applies a 2 C charging current pulse to battery assembly 308 for 10 seconds. In step 1116, the battery is allowed to rest for 1 second and $V_{Nernst}$ is determined. In one example of step 1116, power circuitry 302 discontinues charging battery assembly 308 for one second and controller 304 determines $V_{Nernst}$ of battery assembly 308.

Step 1118 determines if $V_{Nernst}$ is less than 40 millivolts. If yes, method 1100 proceeds to step 1120, and if no, method 1100 proceeds to step 1122. In one example of step 1118, controller 304 compares $V_{Nernst}$ to a 40 millivolt threshold. In step 1120, the battery charge rate is increased by 0.25 C, and in step 1122, the battery charge rate is decreased by 0.25 C. In one example of step 1120, power circuitry 302 increases charging rate of battery assembly 308 by 0.25 C, and in one example of step 1122, power circuitry 302 decreases charging rate of battery assembly 308 by 0.25 C. Method 1100 continues from each of steps 1120 and 1122 to step 1124 where the battery is charged for 10 seconds.

Step 1126 determines if battery voltage is less than 4.2 volts. If yes, method 1100 returns to step 1116, and if no, method 1100 proceeds to step 1128. In one example of step 1126, controller 304 determines whether battery voltage $V_{bat}$ is less than 4.2 volts. In step 1128, the battery is charged at a constant voltage until battery current magnitude drops to C/20. In one example of step 1128, power circuitry charges battery assembly 308 at 4.2 volts until battery current magnitude drops to C/20.

Method 1200 of FIG. 12 is like method 1100 of FIG. 11, but where the battery is charged at 50 percent duty cycle. In particular, steps 1104, 1114, and 1124 of method 1100 are replaced with steps 1204, 1214, and 1224, respectively, where the battery is charged for three seconds instead of for ten seconds, and steps 1106 and 1116 are replaced with steps 1206 and 1216, respectively, where the battery is allowed to relax for three seconds instead of for one second. Method 1200 is otherwise like method 1100.

Figure 13:
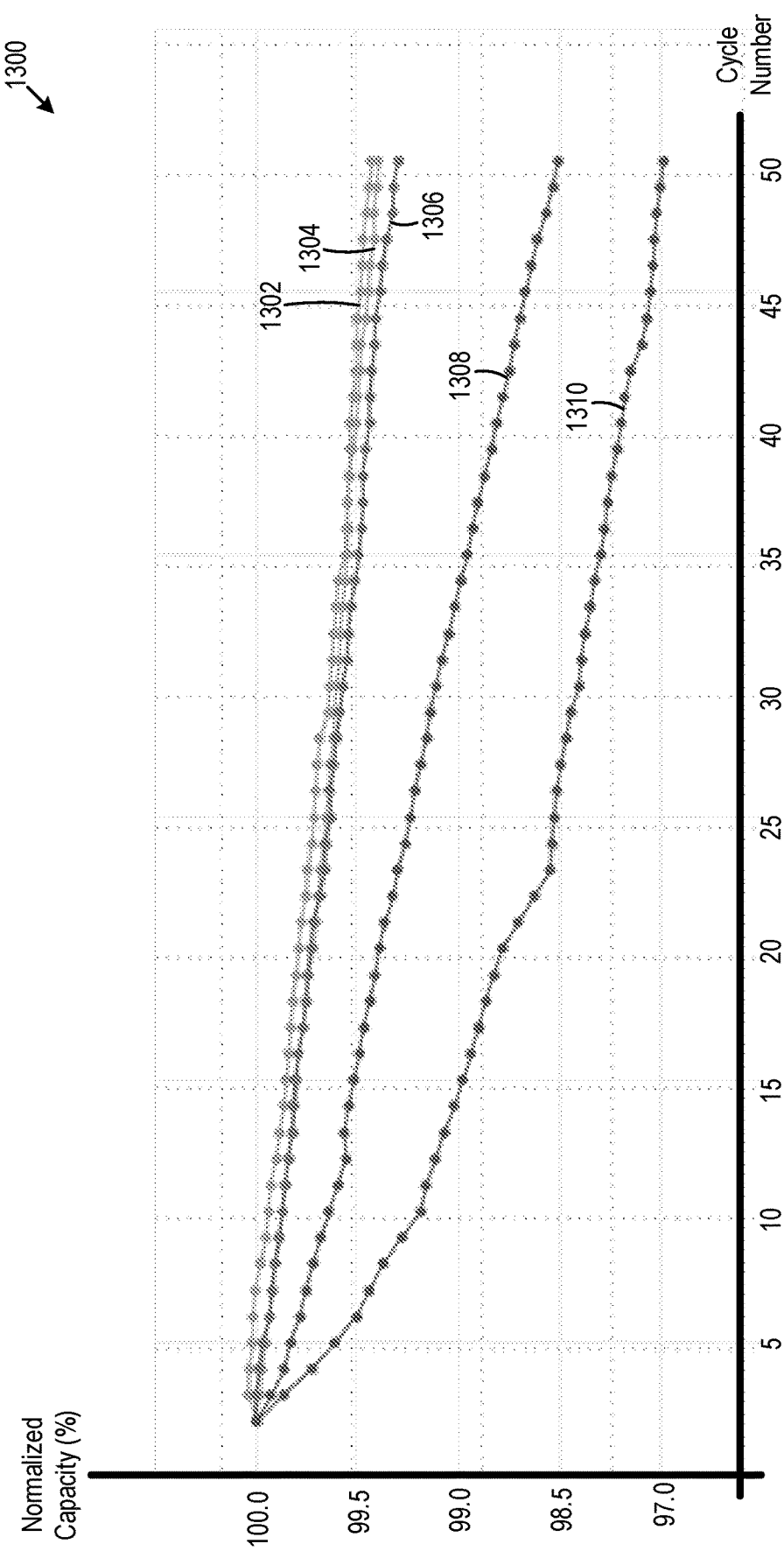
FIG. 13 is a graph of simulated battery capacity verses number of cycles for batteries charged according to several different battery charging methods.

FIG. 13 is a graph 1300 of simulated battery capacity verses number of cycles. Curves 1302 and 1304 correspond to a battery being charged according to method 1100 of FIG. 11, and curve 1306 corresponds to a battery being charged according to method 1200 of FIG. 12. Curves 1308 and 1310, on the other hand, correspond to a battery being charged according to a conventional CCCV method, such as the method of FIG. 1. As evident from FIG. 13, the batteries charged according to methods 1100 and 1200 retain significantly more capacity after cycling than the batteries charged according to the conventional CCCV method.

Figure 14:
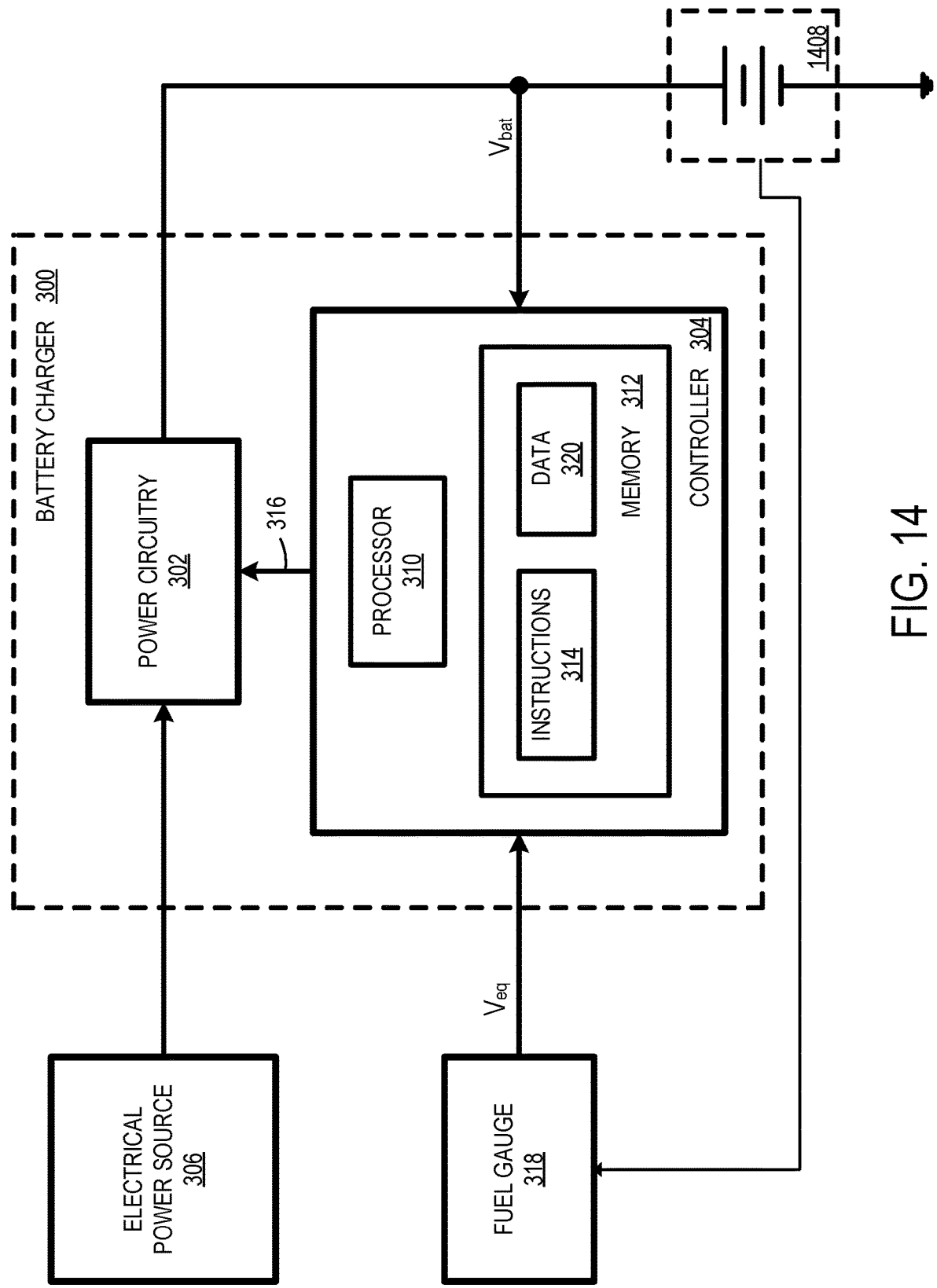
FIG. 14 illustrates an instance of the FIG. 3 battery charger electrically coupled to a single battery, according to an embodiment.
Figure 15:
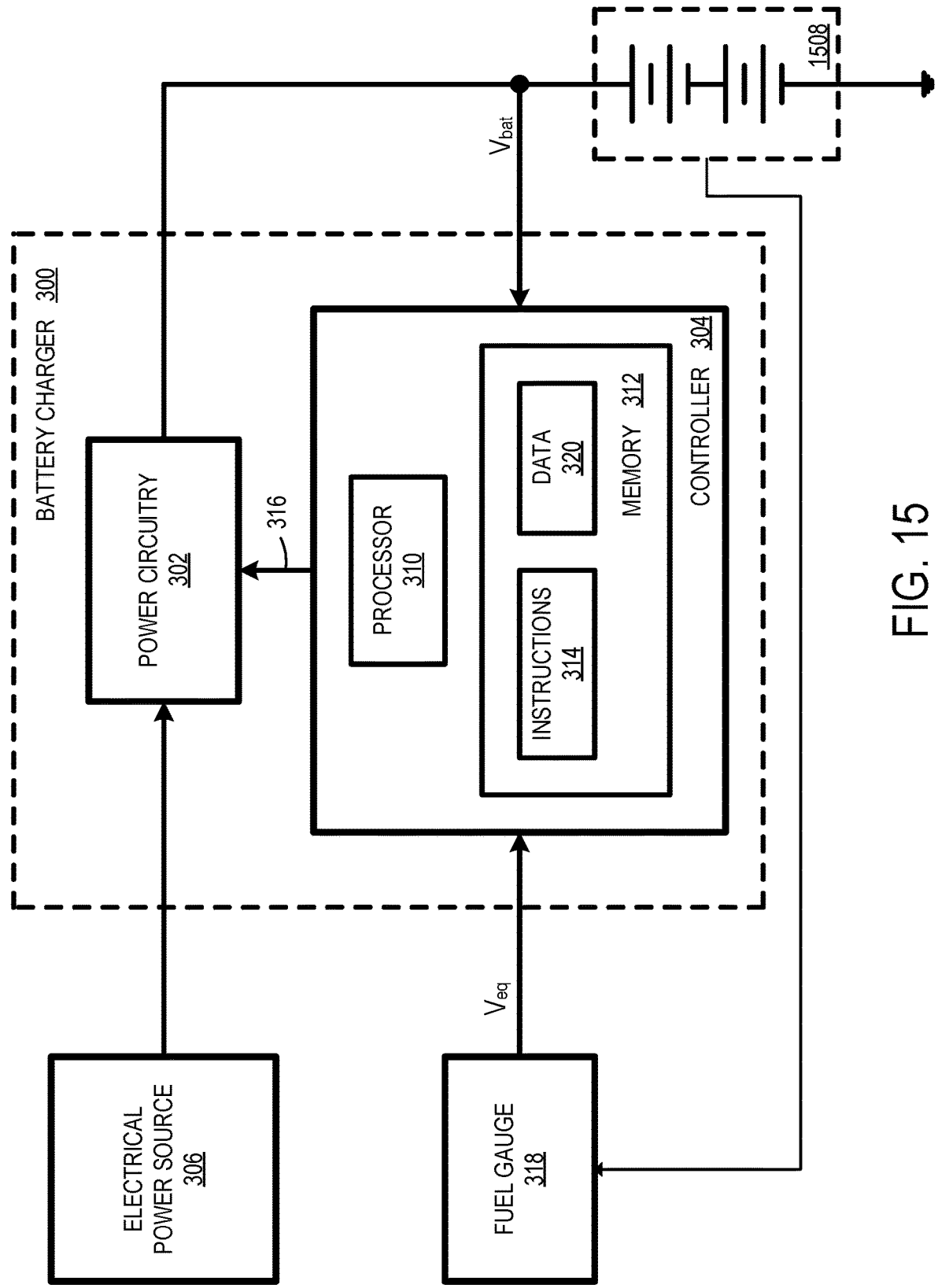
FIG. 15 illustrates an instance of the FIG. 3 battery charger electrically coupled to two batteries electrically coupled in series, according to an embodiment.
Figure 16:
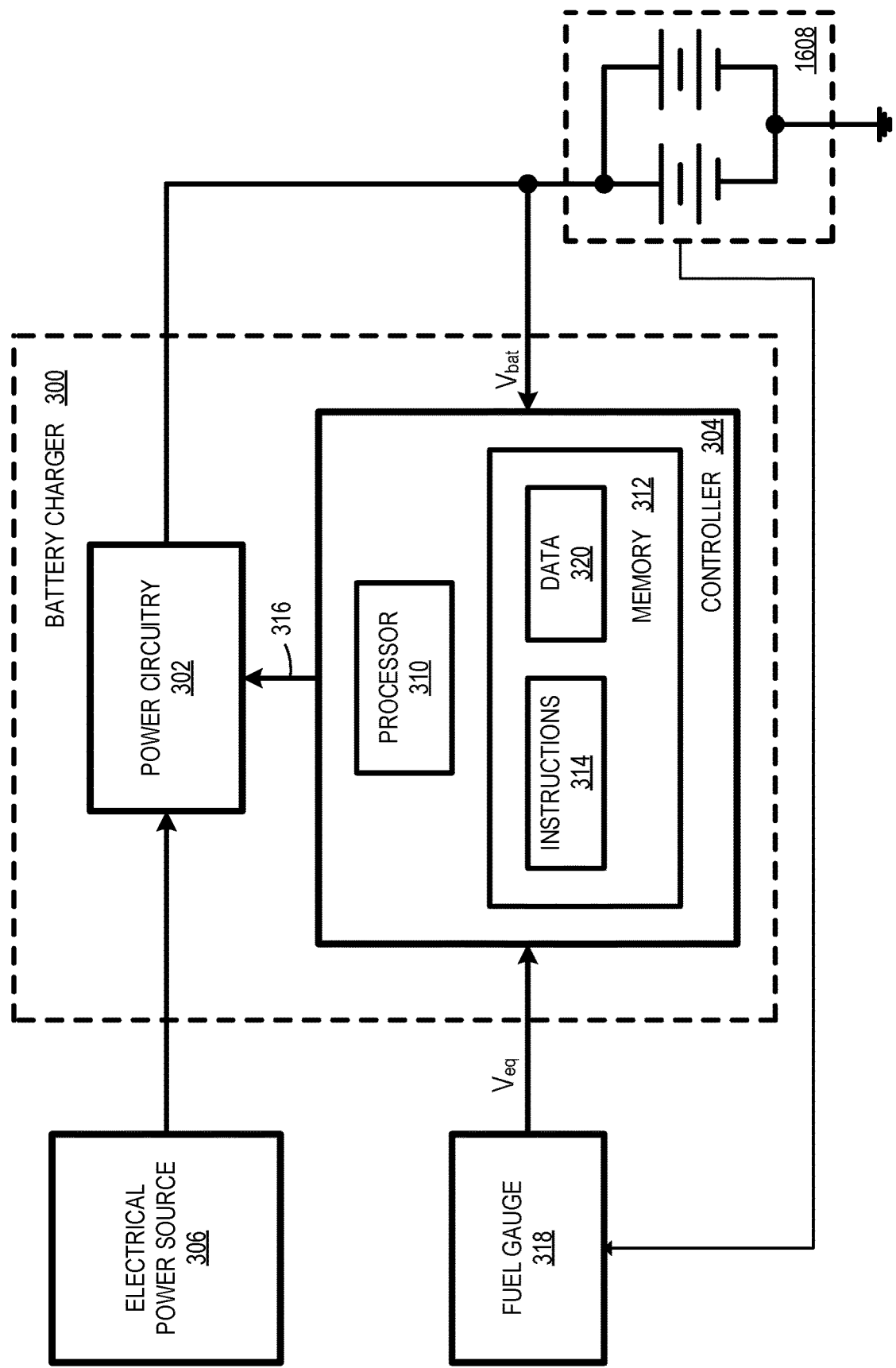
FIG. 16 illustrates an instance of the FIG. 3 battery charger electrically coupled to two batteries electrically coupled in parallel, according to an embodiment.
Figure 17:
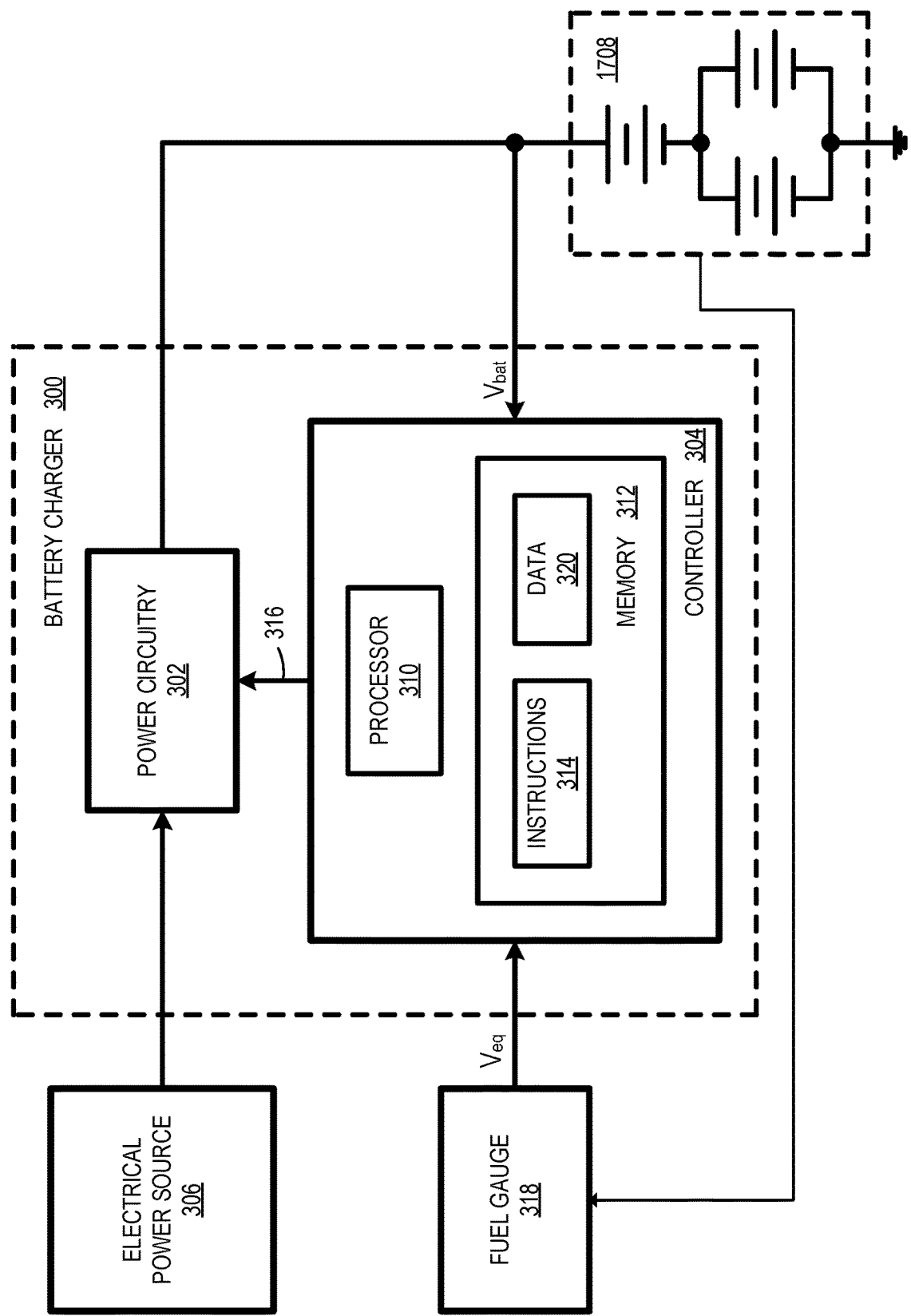
FIG. 17 illustrates an instance of the FIG. 3 battery charger electrically coupled to a plurality of batteries having a series-parallel electrical topology, according to an embodiment.

As discussed above, battery assembly 308 includes one or more batteries. FIG. 14 illustrates battery assembly 308 being implemented by a battery assembly 1408 including a single battery. FIG. 15 illustrates battery assembly 308 being implemented by a battery assembly 1508 including two batteries electrically coupled in series, and FIG. 16 illustrates battery assembly 308 being implemented by a battery assembly 1608 including two batteries electrically coupled in parallel. Each of battery assemblies 1508 and 1608 could be modified to include additional batteries without departing from the scope hereof. FIG. 17 illustrates battery assembly 308 being implemented by a battery assembly 1708 including a plurality of batteries electrically coupled in a series-parallel electrical topology. The number of batteries in battery assembly 1708, as well as their specific series-parallel electrical topology, may vary without departing from the scope hereof.

Figure 18:
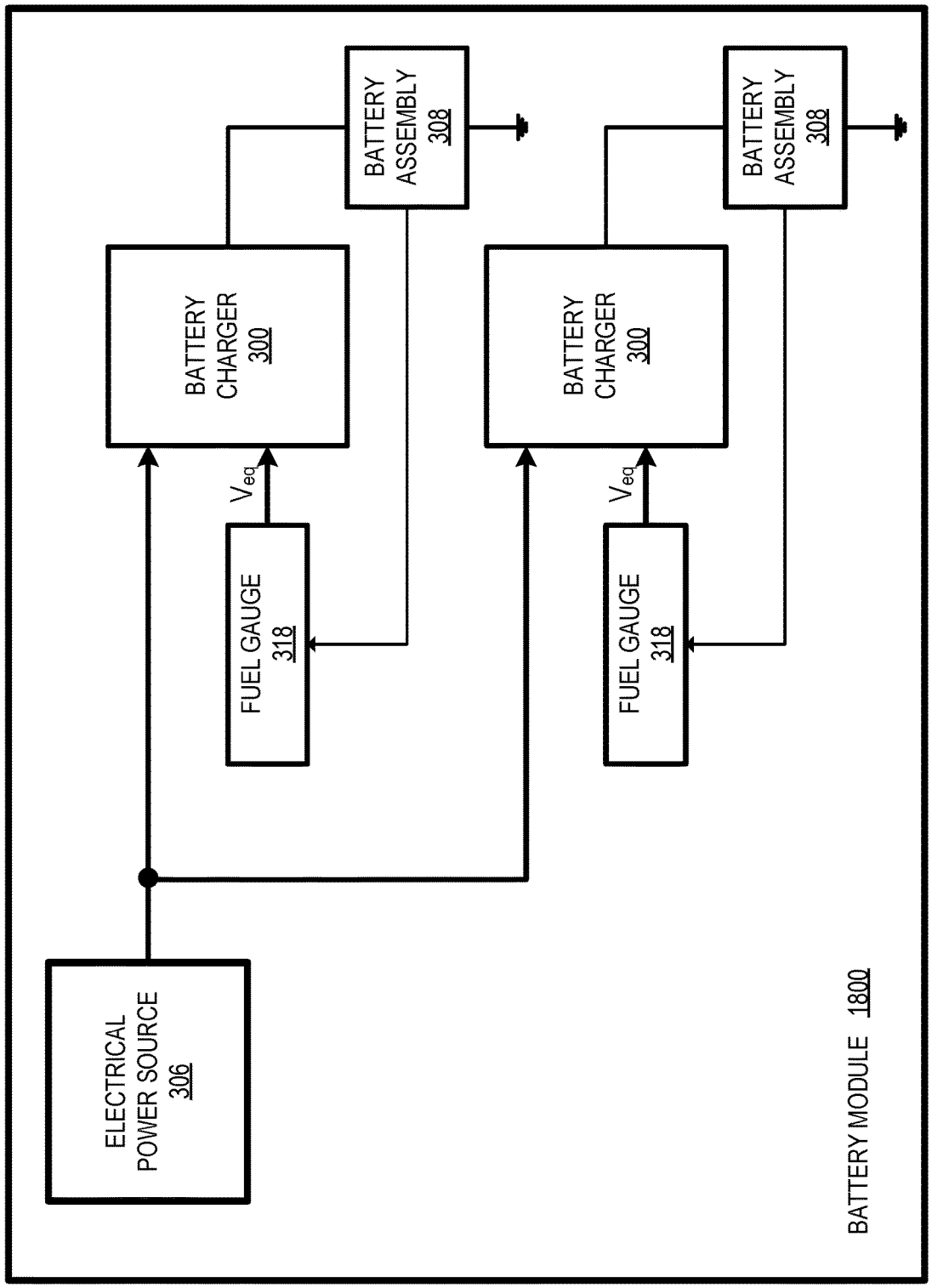
FIG. 18 illustrates a battery module including two instances of the FIG. 3 battery charger, according to an embodiment.

In applications requiring multiple battery assemblies, a respective instance of battery charger 300 may be used for each battery assembly. For example, FIG. 18 illustrates a battery module 1800 including two instances of battery charger 300, where each battery charger 300 is electrically coupled to respective battery assembly 308 and a respective fuel gauge 318. Although each instance of battery charger 300 is powered by a common electrical power source 306, each battery charger 300 instance could alternately be powered from a respective electrical power source. Battery module 1800 could be modified to include additional instances of battery charger 300, battery assembly 308, and fuel gauge 318 without departing from the scope hereof. Details of battery chargers 300 are not shown in FIG. 18 to promote illustrative clarity.

Figure 19:
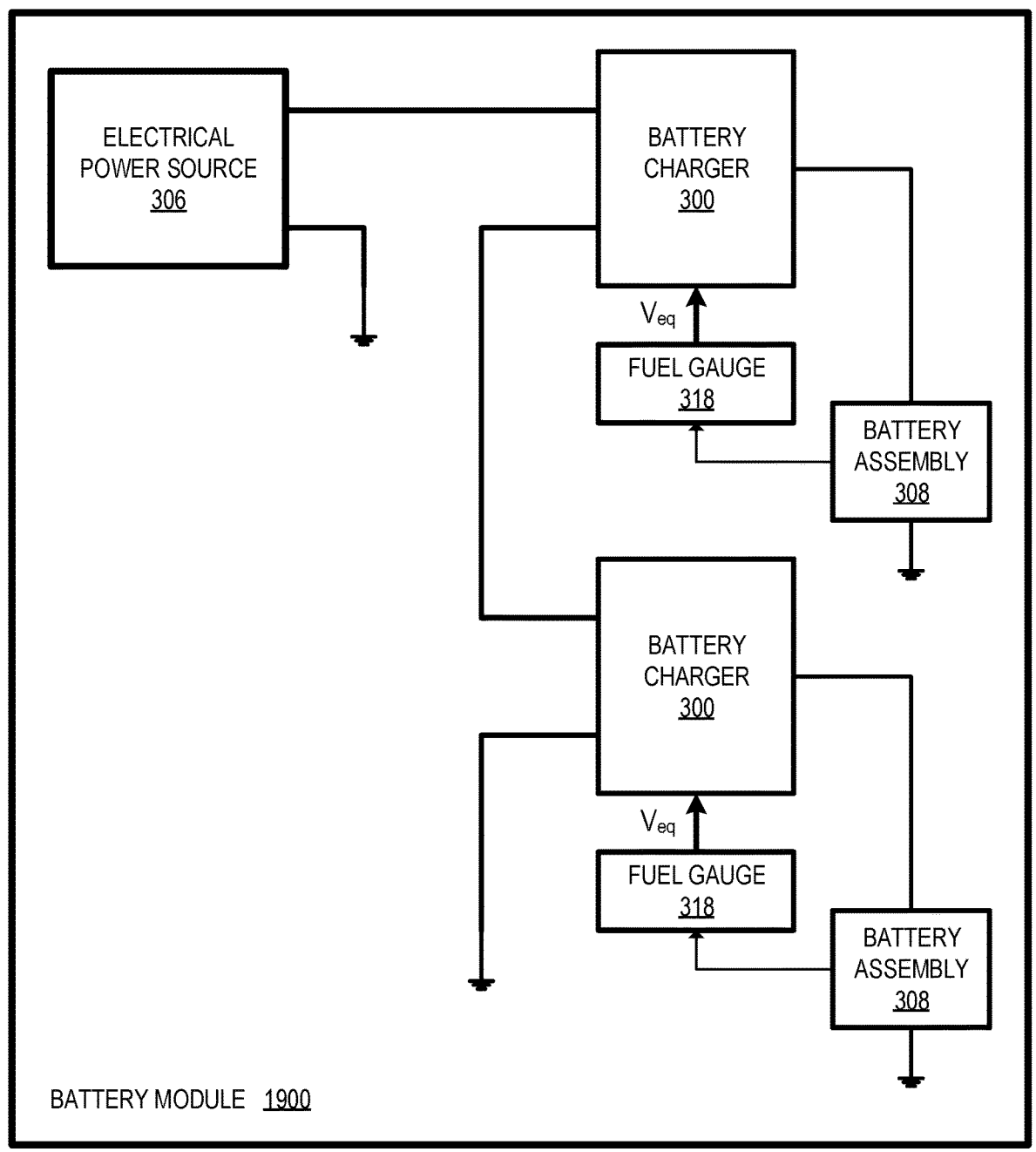
FIG. 19 illustrates another battery module including two instances of the FIG. 3 battery charger, according to an embodiment.

Battery chargers 300 are electrically coupled to electrical power source 306 in parallel in the FIG. 18 battery module. However, battery chargers 300 could also be electrically coupled to an electric power source in series. For example, FIG. 19 illustrates a battery module 1900 including two instances of battery charger 300 electrically coupled to electrical power source 306 in series. Like battery module 1800, each battery charger 300 in battery module 1900 is electrically coupled to respective battery assembly 308 and a respective fuel gauge 318. Battery module 1900 could be modified to include additional instances of battery charger 300, battery assembly 308, and fuel gauge 318 without departing from the scope hereof.

Combinations of Features

Features described above may be combined in various ways without departing from the scope hereof. The following examples illustrate some possible combinations:

(A1) A method for charging a battery may include (1) applying a charging current pulse to the battery, (2) after the step of applying the charging current pulse to the battery, measuring a first voltage across the battery, (3) estimating an equilibrium voltage of the battery, (4) determining a Nernst voltage of the battery from a difference between the first voltage and the equilibrium voltage, and (5) controlling charging of the battery at least partially based on the Nernst voltage.

(A2) The method denoted as (A1) may further include comparing the Nernst voltage to a first threshold value and decreasing a rate of charging of the battery in response to the Nernst voltage exceeding the first threshold value.

(A3) In the method denoted as (A2), the step of decreasing the rate of charging of the battery may include at least one of the following steps: (1) decreasing a magnitude of charging current pulses to the battery, (2) decreasing a duty cycle of charging current pulses to the battery, and (3) decreasing a frequency of charging current pulses to the battery.

(A4) Any one of the methods denoted as (A1) through (A3) may further include comparing the Nernst voltage to a second threshold value and increasing a rate of charging of the battery in response to the Nernst voltage being below the second threshold value.

(A5) In the method denoted as (A4), the step of increasing the rate of charging of the battery may include at least one of the following steps: (1) increasing a magnitude of charging current pulses to the battery, (2) increasing a duty cycle of charging current pulses to the battery, and (3) increasing a frequency of charging current pulses to the battery.

(A6) In any one of the methods denoted as (A4) and (A5), the first threshold value may be different from the second threshold value.

(A7) In any one of the methods denoted as (A4) and (A5), the first threshold value may be the same as the second threshold value.

(A8) Any one of the methods denoted as (A1) through (A7) may further include controlling charging of the battery based on an activation over-voltage of the battery.

(A9) In any one of the methods denoted as (A1) through (A8), the step of controlling charging of the battery at least partially based on the Nernst voltage may include controlling charging of the battery such that a concentration stress of the battery does not exceed a maximum permitted concentration stress of the battery.

(A10) In the method denoted as (A9), the step of controlling charging of the battery at least partially based on the Nernst voltage may further include controlling charging of the battery such that the concentration stress is substantially equal to a maximum permitted concentration stress of the battery.

(A11) In any one of the methods denoted as (A9) and (A10), the battery may include one or more lithium-ion electrochemical cells.

(A12) In the method denoted as (A11), the concentration stress may be a concentration gradient of lithium ions in the battery.

(A13) Any one of the methods denoted as (A1) through (A12) may further include controlling charging of the battery such that a voltage across the battery does not exceed a maximum permitted voltage of the battery.

(A14) In any one of the methods denoted as (A1) through (A13), the step of measuring the first voltage across the battery may include measuring the first voltage after change in voltage across the battery due to ohmic and activation over-voltage effects.

(A15) In any one of the methods denoted as (A1) through (A14), estimating the equilibrium voltage of the battery may include estimating the equilibrium voltage using a fuel gauge configured to determine energy remaining in the battery.

(B1) A battery charger may include power circuitry configured to apply charging current pulses to a battery and a controller configured to (1) cause the power circuitry to apply a first charging current pulse to the battery, (2) after the step of applying the first charging current pulse to the battery, measure a first voltage across the battery, (3) estimate an equilibrium voltage of the battery, (4) determine a Nernst voltage of the battery at least from a difference between the first voltage and the equilibrium voltage, and (5) control the power circuitry to control charging of the battery at least partially based on the Nernst voltage.

(B2) In the battery charger denoted as (B1), the controller may be further configured to compare the Nernst voltage to a first threshold value and control the power circuitry to decrease a rate of charging of the battery in response to the Nernst voltage exceeding the first threshold value.

(B3) In the battery charger denoted as (B2), the power circuitry may be configured to decrease the rate of charging of the battery by at least one of (1) decreasing a magnitude of charging current pulses to the battery, (2) decreasing a duty cycle of charging current pulses to the battery, and (3) decreasing a frequency of charging current pulses to the battery.

(B4) In any one of the battery chargers denoted as (B1) through (B3), the controller may be further configured to compare the Nernst voltage to a second threshold value and control the power circuitry to increase a rate of charging of the battery in response to the Nernst voltage being below the second threshold value.

(B5) In the battery charger denoted as (B4), the power circuitry may be configured to increase the rate of charging of the battery by at least one of (1) increasing a magnitude of charging current pulses to the battery, (2) increasing a duty cycle of charging current pulses to the battery, and (3) increasing a frequency of charging current pulses to the battery.

(B6) In any one of the battery chargers denoted as (B4) and (B5), the first threshold value may be different from the second threshold value.

(B7) In any one of the battery chargers denoted as (B4) and (B5), the first threshold value may be the same as the second threshold value.

(B8) In any one of the battery chargers denoted as (B1) through (B7), the controller may be further configured to control charging of the battery based on an activation over-voltage of the battery.

(B9) In any one of the battery chargers denoted as (B1) through (B8), the controller may be further configured to control the power circuitry such that a concentration stress of the battery does not exceed a maximum permitted concentration stress of the battery.

(B10) In the battery charger denoted as (B9), the controller may be further configured to control the power circuitry such that the concentration stress is substantially equal to a maximum permitted concentration stress of the battery.

(B11) In any one of the battery chargers denoted as (B1) through (B10), the controller may be further configured to control the power circuitry such that a voltage across the battery does not exceed a maximum permitted voltage of the battery.

(B12) In any one of the battery chargers denoted as (B1) through (B11), the controller may be further configured to measure the first voltage across the battery after change in voltage across the battery due to ohmic and activation over-voltage effects.

(C1) A battery module may include a battery and any one of the battery chargers denoted as (B1) through (B12).

(C2) In the battery module denoted as (C1), the battery may include one or more lithium-ion electrochemical cells.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for charging a battery, comprising:
applying a charging current pulse to the battery;
after the step of applying the charging current pulse to the battery, measuring a first voltage across the battery;
estimating an equilibrium voltage of the battery;
determining a Nernst voltage of the battery from a difference between the first voltage and the equilibrium voltage; and
controlling charging of the battery at least partially based on the Nernst voltage.

2. The method of claim 1, further comprising:
comparing the Nernst voltage to a first threshold value; and
decreasing a rate of charging of the battery in response to the Nernst voltage exceeding the first threshold value.

3. The method of claim 2, the step of decreasing the rate of charging of the battery comprising at least one of the following steps:
decreasing a magnitude of charging current pulses to the battery;
decreasing a duty cycle of charging current pulses to the battery; and
decreasing a frequency of charging current pulses to the battery.

4. The method of claim 1, further comprising:
comparing the Nernst voltage to a second threshold value; and
increasing a rate of charging of the battery in response to the Nernst voltage being below the second threshold value.

5. The method of claim 4, the step of increasing the rate of charging of the battery comprising at least one of the following steps:
increasing a magnitude of charging current pulses to the battery;
increasing a duty cycle of charging current pulses to the battery; and
increasing a frequency of charging current pulses to the battery.

6. The method of claim 1, further comprising controlling charging of the battery based on an activation over-voltage of the battery.

7. The method of claim 1, wherein the step of controlling charging of the battery at least partially based on the Nernst voltage comprises controlling charging of the battery such that a concentration stress of the battery does not exceed a maximum permitted concentration stress of the battery.

8. The method of claim 7, wherein the step of controlling charging of the battery at least partially based on the Nernst voltage further comprises controlling charging of the battery such that the concentration stress is substantially equal to a maximum permitted concentration stress of the battery.

9. The method of claim 7, wherein the battery comprises one or more lithium-ion electrochemical cells, and the concentration stress is a concentration gradient of lithium ions in the battery.

10. The method of claim 1, further comprising controlling charging of the battery such that a voltage across the battery does not exceed a maximum permitted voltage of the battery.

11. The method of claim 1, wherein the step of measuring the first voltage across the battery comprises measuring the first voltage after change in voltage across the battery due to ohmic and activation over-voltage effects.

12. The method of claim 1, wherein estimating the equilibrium voltage of the battery comprises estimating the equilibrium voltage using a fuel gauge configured to determine energy remaining in the battery.

13. A battery charger, comprising:
power circuitry configured to apply charging current pulses to a battery; and
a controller configured to:
cause the power circuitry to apply a first charging current pulse to the battery,
after the step of applying the first charging current pulse to the battery, measure a first voltage across the battery,
estimate an equilibrium voltage of the battery,
determine a Nernst voltage of the battery at least from a difference between the first voltage and the equilibrium voltage, and control the power circuitry to control charging of the battery at least partially based on the Nernst voltage.

14. The battery charger of claim 13, wherein the controller is further configured to:
compare the Nernst voltage to a first threshold value; and
control the power circuitry to decrease a rate of charging of the battery in response to the Nernst voltage exceeding the first threshold value.

15. The battery charger of claim 14, wherein the power circuitry is configured to decrease the rate of charging of the battery by at least one of:
decreasing a magnitude of charging current pulses to the battery;
decreasing a duty cycle of charging current pulses to the battery; and
decreasing a frequency of charging current pulses to the battery.

16. The battery charger of claim 13, wherein the controller is further configured to:
compare the Nernst voltage to a second threshold value; and
control the power circuitry to increase a rate of charging of the battery in response to the Nernst voltage being below the second threshold value.

17. The battery charger of claim 16, wherein the power circuitry is configured to increase the rate of charging of the battery by at least one of:
increasing a magnitude of charging current pulses to the battery,
increasing a duty cycle of charging current pulses to the battery, and
increasing a frequency of charging current pulses to the battery.

18. The battery charger of claim 13, wherein the controller is further configured to control charging of the battery based on an activation over-voltage of the battery.

19. The battery charger of claim 13, wherein the controller is further configured to control the power circuitry such that a concentration stress of the battery does not exceed a maximum permitted concentration stress of the battery.

20. The battery charger of claim 19, wherein the controller is further configured to control the power circuitry such that the concentration stress is substantially equal to a maximum permitted concentration stress of the battery.

* * * * *